United States Patent [19]
Bäbler

[11] Patent Number: 5,997,627
[45] Date of Patent: Dec. 7, 1999

[54] PIGMENT COMPOSITION AND EFFECT COATINGS

[75] Inventor: Fridolin Bäbler, Hockessin, Del.

[73] Assignee: Ciba Specialty Chemicals Corporation, Tarrytown, N.Y.

[21] Appl. No.: 08/967,799

[22] Filed: Nov. 12, 1997

Related U.S. Application Data

[60] Provisional application No. 60/030,510, Nov. 13, 1996.

[51] Int. Cl.$^6$ ..................................................... C08K 5/00
[52] U.S. Cl. .......................... 106/493; 106/403; 106/404; 106/413; 106/417; 106/418; 106/432; 106/433; 106/437; 106/452; 106/453; 106/455; 106/456; 106/479; 106/480; 106/481; 106/493; 106/495; 428/411.1
[58] Field of Search ..................................... 106/403, 404, 106/413, 417, 418, 432, 433, 437, 452, 453, 455, 456, 479, 480, 481, 493, 495; 428/411.1

[56] References Cited

U.S. PATENT DOCUMENTS 4,424,239   1/1984   Nota et al. ............................ 427/388.3
4,927,860   5/1990   Hilaire et al. .............................. 521/60

OTHER PUBLICATIONS

American Paint & Coatings Journal, Jun. 24, 1996, pp. 12–16, Loar et al., Polyethylene Homopolymers, Copolymers, in VOC—Compliant Coating Systems.

*Primary Examiner*—Mark L. Bell
*Assistant Examiner*—Scott L. Hertzog
*Attorney, Agent, or Firm*—Kevin T. Mansfield; Jacob M. Levine

[57] ABSTRACT

The disclosure describes pigment compositions containing a small particle size porous filler and a pigment, and their use for preparing effect coating compositions which produce thin film finishes exhibiting strong lightness and color flop with a pronounced three dimensional effect. The thin film finishes are particularly interesting as automotive finishes.

35 Claims, No Drawings

PIGMENT COMPOSITION AND EFFECT COATINGS

This application claims the benefit under 35 U.S.C. 119(e) of U.S. Provisional Application No. 60/030,510, filed Nov. 13, 1996.

SUMMARY

The present invention relates to pigment compositions and a method of using the pigment compositions to prepare coating compositions which yield thin film finishes having a three dimensional appearance.

BACKGROUND

Effect pigments, also known as gloss or lustrous pigments, are well known as pigments which produce unique coloristic effects. The optical properties of effect pigments are governed by reflection and/or interference phenomenon. In particular, finishes containing an effect pigment produce a "flop effect" whereby the coloristic characteristics of the finish change depending on the viewing angle. In general, when a change in viewing angle results in a change in lightness, the effect is referred to as "lightness flop", and when the change is in hue, the effect is referred to as "color flop".

Due to their unique color characteristics, the market for effect pigments is growing in such uses as cosmetics, inks, plastics and paints, especially automotive paints. Weatherfast effect pigments are currently employed in large quantities in the automotive paint industry.

This invention relates to the surprising discovery that thin film finishes with new styling effects are prepared using a coating composition containing a small particle size filler having a porous surface, such as a ultrafine polyamide powder, in addition to an effect-producing amount of an effect pigment; especially when the small particle size filler is incorporated into the coating composition as a component of a pigment composition which also contains a colored pigment. In particular, such coating compositions produce finishes which possess a high lightness and color flop, as well as a profound color deepness, resulting in a three-dimensional appearance.

DETAILED DESCRIPTION

The present invention relates to pigment compositions which comprise from 5 to 50 parts by weight of a small particle size filler having a porous surface and from 50 to 95 parts by weight of a colored pigment, wherein the sum of the parts by weight of the filler and colored pigment is 100. The inventive pigment compositions are used in conjunction with an effect pigment to pigment coating compositions that are used to prepare thin film finishes possessing unique styling effects; in particular a three dimensional effect wherein the essentially two dimensional film has the appearance of possessing significant depth.

Preferably, the pigment composition comprises from about 10 to 40 parts by weight of the filler and about 60 to 90 parts by weight of the pigment, most preferably from about 15 to 35 parts by weight of the filler and from about 65 to 85 parts by weight of the pigment; in each instance the sum of the parts by weight of the filler and colored pigment is 100.

In general, the filler consists essentially of particles having a porous surface and a mean particle size below 12 $\mu$m, in particular in the range of from 1 to 10 $\mu$m; especially from 2 to 8 $\mu$m; in particular those wherein 90 percent of the filler particles have a particle size below 20 $\mu$m, for example in the range of from 1 to 18 $\mu$m, especially from 1 to 9 $\mu$m, as determined by laser diffraction analysis. Preferred fillers are composed primarily of particles having a spherical shape.

In general, the expression "porous surface" means that there are numerous holes or pores in the surface of the filler particle. In general, the pores mainly have a diameter in the range of from 0.05 to 0.6 $\mu$m; especially in the range from 0.1 to 0.4 $\mu$m.

The pore size is easily measured by scanning electron microscopy. Typically, a scanning electron micrograph shows pumiceous spherical particles which have surface pores.

Preferably, the specific surface area of the filler particles according to this invention is above 3 $m^2$/gram, measured by the BET method. Most preferably, the specific surface area is above 4 $m^2$/gram, especially above 5 $m^2$/gram, in particular in the range from 5 to 12 $m^2$/gram.

In general, the filler is a polymeric organic filler. Polyamide fillers are especially suitable, in particular those composed of polymerized lauryllactam or caprolactam, or polymerized mixtures thereof. Highly suitable polyamide fillers are commercially available, for example, ORGASOL® from Elf Atochem. Most preferably, the filler is a polyamide filler having a mean particle size in the range of from 2 to 8 $\mu$m and a surface area in the range from 5 to 12 $m^2$/gram, such as ORGASOL 2001 UD NAT, which is described as having an average particle size of about 5 microns and a specific surface area of around 10 $m^2$/gram. Thin film finishes containing such polyamide fillers possess good abrasion resistance and suprisingly high gloss without adverse effects like the loss of intercoat adhesion or damage by weathering, in addition to exhibiting a three dimensional appearance.

Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, or a mixture or solid solution thereof.

Suitable colored pigments also include inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate and mixed metal oxides.

Most preferably, the colored pigment is a transparent organic pigment. Pigment compositions wherein the colored pigment is a transparent organic pigment having a particle size range of below 0.2 µm, preferably below 0.1 µm, are particularly interesting. For example, inventive pigment compositions containing, as transparent organic pigment, the transparent quinacridones in their magenta and red colors, the transparent yellow pigments, like the isoindolinones or the yellow quinacridone/quinacridonequinone solid solutions, transparent copper phthalocyanine blue and halogenated copper phthalocyanine green, or the highly-saturated transparent diketopyrrolopyrrole or dioxazine pigments are particularly interesting.

Typically the pigment composition is prepared by blending the pigment with the filler by known dry or wet mixing techniques. For example, the components are wet mixed in the end step of a pigment preparatory process, or by blending the filler into an aqueous pigment slurry, the slurry mixture is then filtered, dried and micropulverized.

In a preferred method, the pigment is dry blended with the filler in any suitable device which yields a nearly homogenous mixture of the pigment and the filler. Such devices are, for example, containers like flasks or drums which are submitted to rolling or shaking, or specific blending equipment like for example the TURBULA mixer from W. Bachofen, CH-4002 Basel, or the P-K TWIN-SHELL INTENSIFIER BLENDER from Patterson-Kelley Division, East Stroudsburg, Pa. 18301.

The pigment compositions are generally used in the form of a powder which is incorporated into a high-molecular-weight organic composition, such as a coating composition, to be pigmented.

The pigment composition consists of or consists essentially of the filler and colored pigment, as well as customary additives for pigment compositions. Such customary additives include texture-improving agents and/or antiflocculating agents.

Typical texture-improving agents include fatty acids having at least 12 carbon atoms, and amides, esters or salts of fatty acids. Fatty acid derived texture-improving agents include fatty acids such as stearic acid or behenic acid, and fatty amines like laurylamine, or stearylamine. In addition, fatty alcohols or ethoxylated fatty alcohols, polyols, like aliphatic 1,2-diols or polyvinylalcohol and epoxidized soya bean oil, waxes, resin acids and resin acid salts are suitable texture-improving agents.

Antiflocculating agents, also described as rheology improving agents or particle growth inhibitors, are well known in the pigment industry and are used primarily in small and medium particle size organic pigments. Rheology improving agents include particularly pigment derivatives like the sulfonic acid, sulfonic acid salts or sulfonamide derivatives. Typically, they are used in a concentration of 0.5 to 8 percent based on the organic pigment.

The customary additives are incorporated into the pigment composition before, during or after the blending step. Preferably the additives are added to the colored pigment before blending with the filler. Thus, the inventive pigment compositions further contain additives in an amount of from 0.05 to 20 percent by weight, based on the colored pigment.

The present invention further relates to a method of preparing a thin film finish having a three dimensional appearance, which comprises:
(a) preparing a coating composition comprising a binder, an effect-producing amount of an effect pigment, an effective coloring amount of a colored pigment, and an effect-enhancing amount of a small particle size filler having a porous surface, and (b) applying the coating composition to a substrate to yield a thin film having a three dimensional effect wherein the essentially two dimensional film has the appearance of possessing significant depth.

The binder is a high-molecular-weight organic compound conventionally used in coating compositions.

The coating composition is generally a heat curable, air-drying or physically-drying, or cross-linking chemically-reactive coating system. In particular, the coating composition is a stoving finish containing a binder selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins, diene rubbers and copolymers thereof. Most preferably, the coating composition is an aqueous or solvent based automotive paint system.

The binder is especially a binder useful for aqueous or solvent based automotive finishes; including acrylic/melamine resin, alkyd/melamine resin or thermoplastic acrylic resin systems, as well as particular aqueous coating systems, especially those based on water dispersible or water-soluble ionic or nonionic resins.

In general, the pigment ingredients in the inventive coating compositions comprise from 25 to 65 parts by weight of the colored pigment; from 10 to 60 parts by weight of the effect pigment; and from 10 to 35 parts by weight of the filler, wherein the sum of the parts by weight of the colored pigment, effect pigment and filler is 100. Preferably, the pigment ingredients in the coating composition comprise from 35 to 60 parts by weight of the colored pigment; from 20 to 50 parts by weight of the effect pigment; and from 15 to 30 parts by weight of the filler.

In general, the effect pigment is a metallic-effect pigment, a metal oxide-coated metal pigment, a platelike graphite pigment, a platelike molybdenumdisulfide pigment, a pearlescent mica pigment, a metal oxide-coated mica pigment, an organic effect pigment, a layered light interference pigment, a polymeric holographic pigment or a liquid crystal interference pigment. Preferably, the effect pigment is a metal effect pigment selected from the group consisting of aluminum, gold, brass and copper metal effect pigments; especially aluminum metal effect pigments. Alternatively, preferred effect pigments are pearlescent mica pigments or a large particle size, preferably platelet type, organic effect pigment selected from the group consisting of copper phthalocyanine blue, copper phthalocyanine green, carbazole dioxazine, diketopyrrolopyrrole, iminoisoindoline, irninoisoindolinone, azo and quinacridone effect pigments.

As discussed above, the colored pigment is preferably a transparent organic pigment having a mean particle size below 0.2 µm, preferably below 0.1 µm. Particularly interesting transparent pigments include the transparent quinacridones in their magenta and red colors, the transparent yellow pigments, like the isoindolinones or the yellow quinacridone/quinacridonequinone solid solutions, transparent copper phthalocyanine blue and halogenated copper phthalocyanine green, or the highly-saturated transparent diketopyrrolopyrrole or dioxazine pigments; especially a transparent quinacridone pigment or a transparent diketopyrrolopyrrole pigment.

As discussed above, the filler is preferably a polymeric organic filler, in particular a polyamide filler. Most preferably, the filler is a polyamide filler having an average particle size in the range of from 2 to 8 μm, such as ORGASOL UD NAT from Elf Atochem.

The small particle size filler can be added to the coating composition by any suitable method which provides thin film finishes displaying a 3-dimensional appearance according to this invention. In a preferred method, the small particle size filler is added to the coating composition as a component of a pigment composition which comprises the colored pigment and the small particle size filler.

The coating composition is applied to the substrate by any conventional method, for example by spraying, brushing, dipping or flowing. The preferred application methods are by spraying or electrostatic spraying. These methods are widely used, especially in the application of automotive coatings.

The present invention further relates to a substrate coated with a thin film according to the inventive method. In general, the substrate is a metal, especially, aluminum or steel, or a polymer, such as a thermoplastic polymer, for example, a thermoplastic polyolefin, or a combination thereof. The inventive process is especially useful to color substrates normally coated with automotive finishes, such as automobiles, trucks, and boats. Thus, the expression "automotive finish" includes finishes which could be applied to automobiles, but which are actually applied to other substrates.

The present invention also relates to a thin film prepared by the inventive method. In general, the inventive thin film produced according to the present method is less than 250 μm thick, preferably in the range of from 1 to 150 μm thick, especially in the range from 7 to 35 μm thick, if a monolayer coating, or from 35 to 150, especially from 50–100 μm thick, if a basecoat/clearcoat coating.

This invention further relates to a coating composition useful for producing a thin film finish that appears to possess significant depth, which coating composition comprises a binder, an effect-producing amount of an effect pigment, an effective coloring amount of a colored pigment, and an effect-enhancing amount of a small particle size filler having a porous surface.

In general, the inventive coating compositions comprise from 25 to 65 parts by weight of the colored pigment; from 10 to 60 parts by weight of the effect pigment; and from 10 to 35 parts by weight of the filler, wherein the sum of the parts by weight of the colored pigment, effect pigment and filler is 100. Preferably, the coating composition comprises from 35 to 60 parts by weight of the colored pigment; from 20 to 50 parts by weight of the effect pigment; and from 15 to 30 parts by weight of the filler.

Preferably, the coating composition is a water or solvent based automotive finish. A polyamide filler having a density about the same as water is particularly suitable in a water-based automotive finish.

Especially useful coating compositions are water or solvent based automotive finishes which comprise a metallic, pearlescent mica or graphite effect pigment, a transparent organic pigment as the colored pigment and a porous polyamide as the filler; especially those wherein the porous polyamide filler has a mean particle size in the range of from 2 to 8 μm, especially those having a surface area in the range from 5 to 12 m²/gram.

The inventive pigment compositions are incorporated into the paint system by known methods. Depending on their pigment properties like pigment particle size, wetability and dispersibility, they are incorporated by a dispersion process in a bead mill or directly as stir-in pigments. Pigment compositions containing small particle size organic pigments, particularly the transparent organic pigments, are preferably bead milled, whereas pigment compositions containing large particle size organic, inorganic and effect pigments are preferably incorporated without bead milling as stir-in pigments.

The optimum three dimensional effect is obtained by varying the concentration of the components in the inventive coating composition, and particularly by varying the ratio of filler to colored and effect pigment.

The coating composition according to this invention may include small amounts of rheology control agents known in the paint industry, for example fumed silica, hectorite clays, bentonite clays, or cellulose derivatives like cellulose acetobutyrate; or other optional ingredients such as wetting agents, surfactants, defoamers, antioxidants, UV absorbers, light stabilizers, plastisizers, and so forth.

In a preferred method, such coating compositions are, for example, obtained by preparing a pigment paint dispersion in a bead mill using a dry blend of the transparent organic pigment with the filler as the inventive pigment composition followed by combining the pigment paint dispersion with an effect pigment dispersion. The thin film finish is prepared by spraying a let down of the resulting paint dispersion on a substrate, like metal or plastic. The substrate is preferably precoated with a primer, as is typical in the automotive industry.

After application of the coating composition to the substrate, the coating is flashed followed by curing, preferably by heating at a temperature of from 115 to 180° C., preferably from 120 to 150° C. for 15 to 60 minutes, preferably 20 to 30 minutes.

The cured and heat treated coating of this invention displays a unique color and lightness flop with a profound three dimensional effect and preferably has a thickness of 1 to 150 μm, more preferably 7 to 35 μm and is typically a monolayer coating.

The coating can be provided with one or more layers of clear or additional effect coatings. The heat curable acrylic/melamine resin combinations known in the field of automotive coatings are preferably used as binders for the clear coatings. The thickness of the dry clear coating film is preferably 30 to 60 μm.

The layer of clear coating can also be prepared by known methods and may also contain polymer soluble organic dyes, such as phthalocyanine dyes, metal complexes of azo dyes or fluorescent dyes or modifiers, such as light stabilizers and/or antioxidants.

It is unexpected that a small particle size filler having a porous surface would generally enhance the color effect of effect pigments when applied in coating systems. The effect is especially striking when the coating is irradiated by direct light from an artificial light source or sunlight. Thus, new unique color stylings can be generated by the inventive pigment compositions by a simple environmentally friendly and economic way.

In addition to the three-dimensional effect, thin film finishes prepared with the present coating compositions suprisingly show higher color strength than expected based on the dilution of the pigment with the filler. For example, a panel coated with a thin film containing 30 parts of filler and 70 parts of colored pigment would be expected to have only 70% of the color strength of a panel coated with 100 parts of the colored pigment. However, a thin film finish prepared with the present coating composition shows greater than expected color strength; which in the above example would be greater than 70% of that observed for the panel coated with undiluted colored pigment. Depending on the colored pigment and relative concentration of the filler and colored pigment, improvements of up to about 5–20% over the color strength that would be expected based on dilution of the colored pigment are often observed.

Colored effect pigments, such as a graphite, coated mica or the organic effect pigments, can function both as the effect pigment and/or the colored pigment.

The following examples further describe embodiments of this invention. In these examples all parts given are by weight unless otherwise indicated.

EXAMPLE 1

A 16 ounce glass jar is charged with 15 grams of the commercially available halogenated copper phthalocyanine green, IRGALITE Green GLN from Ciba-Geigy Corp., 5 grams of the commercially available stabilized alpha copper phthalocyanine blue, IRGAZIN Blue X-3627 from Ciba-Geigy Corp., and 10 grams of an ultrafine polyamide powder having a specific surface area of around 10 $m^2/g$, consisting of round shaped porous particles with a mean particle size of 5±3 μm, ORGASOL 2001 UD NAT from Elf Atochem. The mixture is rolled in the jar on a roller gear for 3 hours yielding a green pigment composition. When incorporated in automotive paint systems in the presence of pearlescent mica and/or metallic effect pigments, new green-colored, highly saturated coatings displaying a strong three dimensional effect are obtained. The coatings show excellent weatherfastness properties.

EXAMPLE 2

A 16 ounce glass jar is charged with 20 grams of the commercially available stabilized alpha copper phthalocyanine blue, IRGAZIN Blue X-3627 from Ciba-Geigy Corp. and 10 grams of the ultrafine polyamide powder ORGASOL 2001 UD NAT from Elf Atochem. The mixture is rolled in the jar on a roller gear for 3 hours yielding a blue pigment composition. When incorporated in automotive paint systems in the presence of pearlescent mica and/or metallic effect pigments, new blue-colored, highly saturated coatings displaying a strong three dimensional effect are obtained. The coatings show excellent weatherfastness properties.

EXAMPLE 3

The procedure of Example 1 is repeated using 20 grams of highly transparent IRGALITE Green GLN from Ciba-Geigy Corp. together with 10 grams of ultrafine polyamide powder yielding a green pigment composition, which shows strong three dimensional effects when applied in combination with aluminum or pearlescent mica pigments in automotive coatings.

EXAMPLE 4

The procedure of Example 3 is repeated using 25 grams of the highly transparent quinacridone pigment MONASTRAL GOLD YT-919-D from Ciba-Geigy Corp. and 10.7 grams of ultrafine polyamide powder yielding a pigment composition which, when incorporated in automotive coating systems in the presence of aluminum pigments, provides yellow metallic coatings displaying a strong three dimensional effect.

EXAMPLE 5

The procedure of Example 4 is repeated using 25 grams of a semi-opaque diketopyrrolopyrrole pigment, IRGAZIN DPP Rubin TR from Ciba-Geigy Corp., and 10.7 grams of ultrafine polyamide powder yielding a pigment composition which, when incorporated in automotive coating systems in the presence of aluminum or pearlescent mica pigments, provides bluish-red effect coatings displaying a strong three dimensional effect. The coatings show excellent weather durability.

EXAMPLE 6

The procedure of Example 3 is repeated using 21 grams of a highly transparent magenta quinacridone pigment, MONASTRAL Magenta RT-243-D from Ciba-Geigy Corp., and 9 grams of ultrafine polyamide powder yielding a pigment composition which provides magenta-colored metallic coatings displaying a strong three dimensional effect with excellent weatherability behavior when incorporated in automotive coating systems in the presence of aluminum effect pigments.

EXAMPLE 7

The procedure of Example 6 is repeated using 20 grams of a semi-opaque magenta quinacridone pigment, MONASTRAL Magenta RT-343-D from Ciba-Geigy Corp., and 10 grams of ultrafine polyamide powder yielding a pigment composition which provides saturated magenta-colored metallic coatings displaying a strong three dimensional effect with excellent weatherability behavior when incorporated in automotive coating systems in the presence of aluminum effect pigments.

EXAMPLE 8

The procedure of Example 6 is repeated using 21 grams of a highly transparent 3,6-di(4-chlorophenyl)-1,4-diketopyrrolo[3,4-c]pyrrole pigment and 9 grams of ultrafine polyamide powder yielding a pigment composition which provides saturated red-colored effect coatings displaying a strong three dimensional effect with excellent weatherability behavior when incorporated in automotive coating systems in the presence of pearlescent mica pigments.

EXAMPLE 9

The procedure of Example 6 is repeated using 1 gram of a highly transparent 3,6-di(4-chlorophenyl)-1,4-diketopyrrolo[3,4-c]pyrrole, 20 grams of a highly transparent quinacridone pigment, MONASTRAL GOLD YT-919-D from Ciba-Geigy Corp., and 9 grams of ultrafine polyamide powder yielding a pigment composition which provides saturated yellowish-red-colored effect coatings displaying a strong three dimensional effect with excellent weatherability behavior when incorporated in automotive coating systems in the presence of pearlescent mica or aluminum pigments.

EXAMPLE 10

The procedure of Example 1 is repeated using 20 grams of a platelike graphite pigment, GRAPHITAN 7525 from Ciba-Geigy Corp., as both a colored and an effect pigment, and 10 grams of ultrafine polyamide powder yielding a pigment composition which provides grey, silky effect coatings displaying a strong three dimensional effect with excellent weatherability behavior when incorporated in automotive coating systems. The three dimensional effect is further enhanced by employing the present pigment composition in the presence of a pearlescent mica or aluminum pigment.

EXAMPLE 11

The inventive pigment compositions are incorporated into an automotive finish as follows:

"Millbase Dispersion"

The following ingredients are added into ½ pint jar containing 980 grams of 5/32" rods as dispersion media:
66.0 grams of acrylourethane resin,
14.5 grams of AB-dispersant,
58.1 grams of solvent (SOLVESSO 100), and
26.4 grams pigment composition obtained according to Example 7.

The pigment is dispersed by rolling the above mixture for 64 hours. The pigment dispersion is separated from the dispersion media providing a homogenous "millbase dispersion" containing 16.0% magenta pigment composition with a total solid content of 48.0% solids in a pigment to binder ratio of 0.5. Despite the small pigment particle size, the dispersion shows excellent viscosity data.

"Mica Dispersion"

The following ingredients are stirred together to provide a mica dispersion containing 27.9% pearlescent mica pigment and a total solid content of 69.1% solids:
251.1 grams of bright white mica, EXTERIOR MEARLIN from The Mearl Corp.,
315.0 grams of nonaqueous dispersion NAD-resin, and
180.0 grams of acrylourethane resin.

"Paint Dispersion"

An 80/20 white mica shade coating is prepared by mixing the following ingredients:
46.1 grams of the above magenta millbase dispersion
6.6 grams of "mica dispersion"
6.9 grams of a nonaqueous dispersion (NAD)-resin, and
70.4 grams of a compensating clear solution.

The magenta pigment/pearlescent mica/resin dispersion is sprayed onto a primed panel twice in a 1.0 minute interval as basecoat. After 3 minutes, clear coat resin is sprayed twice at 1.0 minute intervals onto the basecoat. The sprayed panel is flashed with air in a flash cabinet for 10 minutes and then "baked" in an oven at 265° F. (130° C.). A magenta-colored effect coating with excellent weatherability is obtained. The coating shows high gloss, an attractive flop and a pronounced three dimensional effect.

"Metallic Dispersion"

A quart can is charged with 405 grams 5245AR aluminum paste (Silberline), 315 grams nonaqueous dispersion (NAD) resin and 180 grams acrylic urethane resin and stirred for 1–2 hours until lump free.

"Metallic Paint Dispersion"

A 50/50 metallic shade coating is prepared by mixing the following ingredients:
25.9 grams "millbase dispersion",
14.8 grams "metallic dispersion",
36.2 grams compensating clear color resin solution, and
23.1 grams balanced clear color solid solution.

The viscosity is reduced to 20–22 seconds using a N2 Fisher device using a thinning solvent mixture of the following composition: 76 grams xylene, 21 grams butanol and 3 grams methanol. The magenta pigment/metallic/resin dispersion is sprayed onto a primed panel followed by a clearcoat as described above yielding a magenta-colored effect coating with excellent weatherability. The coating shows high gloss, an attractive flop and a very pronounced three dimensional effect.

EXAMPLE 12

The inventive pigment compositions are incorporated into an automotive finish as follows:

"Millbase Dispersion"

The procedure described in Example 11 is repeated employing 26.4 grams of the green pigment composition obtained according to Example 1 instead of the magenta pigment yielding a green millbase dispersion.

"Paint Dispersion"

A 50/50 white mica shade coating is prepared by mixing the following ingredients:
29.9 grams "millbase dispersion"
17.1 grams "mica dispersion" obtained according to Example 11
6.4 grams acrylourethane resin,
3.6 grams nonaqueous dispersion (NAD)-resin
73.0 grams compensating clear solution.

The green pigment/pearlescent mica/resin dispersion is sprayed onto a panel followed by a clearcoat as described in Example 11. A strong, highly saturated, green-colored effect coating with excellent weatherability is obtained. The green coating shows high gloss, an attractive flop and a pronounced three dimensional effect. The pigment particles are homogeneously distributed in the coating system.

"Metallic Paint Dispersion"

A 50/50 metallic shade coating is prepared by mixing the following ingredients:
25.9 grams "millbase dispersion",
14.8 grams "metallic dispersion" as obtained according to Example 11,
36.2 grams compensating clear color resin solution, and
23.1 grams balanced clear color solid solution are mixed up.

The viscosity is reduced to 20–22 seconds using a N2 Fisher device with a thinning solvent mixture of the following composition: 76 grams xylene, 21 grams butanol and 3 grams methanol. The green pigment/metallic/resin dispersion is sprayed onto a primed panel as described above yielding a strong, highly saturated, green-colored effect coating with outstanding weatherability behavior. The green coating shows high gloss, an attractive flop and a very pronounced three dimensional effect.

EXAMPLE 13

The inventive pigment compositions are incorporated into an automotive finish as follows:

"Millbase Dispersion"

A blue millbase dispersion is prepared by following the procedure described in Example 11 using 26.4 grams of the blue pigment composition obtained according to Example 2 instead of the magenta pigment.

"Paint Dispersion"

A 50/50 white mica shade coating is prepared by mixing the following ingredients:
29.9 grams "millbase dispersion"
17.1 grams "mica dispersion" obtained according to Example 11
6.4 grams acrylourethane resin,
3.6 grams nonaqueous dispersion (NAD)-resin
73.0 grams compensating clear solution The blue pigment/pearlescent mica/resin dispersion is sprayed onto a panel followed by a clearcoat as described in Example 11. A strong, highly saturated, blue-colored effect coating with excellent weatherability is obtained. The blue coating shows high gloss, an attractive flop and a pronounced three dimensional effect. The pigment particles are homogeneously distributed in the coating system.

"Metallic Paint Dispersion"

A 50/50 metallic shade coating is prepared by mixing the following ingredients:
25.9 grams "millbase dispersion",
14.8 grams "metallic dispersion" as obtained according to Example 11, 36.2 grams compensating clear color resin solution, and
23.1 grams balanced clear color solid solution.

The viscosity is reduced to 20–22 seconds using a N2 Fisher device by a thinning solvent mixture of the following composition: 76 grams xylene, 21 grams butanol and 3 grams methanol.

The blue pigment/metallic/resin dispersion is sprayed onto a primed panel as described above yielding a strong highly saturated blue color effect coating with outstanding weatherability behavior. The blue coating shows high gloss, an attractive flop and a very pronounced three dimensional effect.

EXAMPLE 14

The inventive pigment compositions are incorporated into an automotive finish as follows:

"Millbase Dispersion"

A reddish-yellow millbasedispersion is prepared by following the procedure described in Example 11 using 26.4 grams of the yellow pigment composition obtained according to Example 9 instead of the magenta pigment.

"Metallic Paint Dispersion"

A 50/50 metallic shade is prepared by mixing the following ingredients:
25.9 grams "millbase dispersion",
14.8 grams "metallic dispersion" as obtained according to Example 11,
36.2 grams compensating clear color resin solution, and
23.1 grams balanced clear color solid solution are mixed up.

The viscosity is reduced to 20–22 seconds using a N2 Fisher device by a thinning solvent mixture of the following composition: 76 grams xylene, 21 grams butanol and 3 grams methanol.

The yellow pigment/metallic/resin dispersion is sprayed onto a primed panel as described above yielding a strong, highly saturated, reddish-yellow colored effect coating with excellent weatherability behavior. The reddish-yellow coating shows high gloss, attractive flop and a very pronounced three dimensional effect.

EXAMPLE 15

The inventive pigment compositions are incorporated as a stir-in pigment into an automotive finish as follows:

"Stir-in Pigment Dispersion"

The following ingredients are stirred together in a pint jar:
66.0 grams of acrylourethane resin,
14.5 grams of AB-dispersant,
58.1 grams of solvent (SOLVESSO 100).

26.4 grams of the pigment composition obtained according Example 10 are then added to the above resin/solvent mixture as a stir-in pigment. The gray pigment dispersion is stirred at slow to medium speed for 15 to 20 minutes, providing a homogeneous, non-viscous stir-in pigment dispersion containing 16% pigment composition, with a total solid content of 48% solids in a pigment to binder ratio of 0.5.

"Gray Effect Color Shade"

53.5 grams "stir-in pigment dispersion", and 76.5 grams acrylourethane resin are combined with stirring. The grey resin/pigment dispersion is sprayed onto a panel twice in a 1.5 minute interval as basecoat. After 2 minutes, clearcoat resin is sprayed twice at 1½ minute intervals onto the basecoat. The sprayed panel is then flashed with air in a flash cabinet for 10 minutes and then "baked" in an oven at 250° F. (121° C.) for 30 minutes, yielding a silky, grey effect coating with an pronounced three dimensional effect and excellent weatherability. A microscopic evaluation shows a homogeneous distribution of the pigment particles in the coating.

I claim:

1. A pigment composition which comprises from 5 to 50 parts by weight of a filler having a porous surface, a mean particle size below 12 $\mu$m and a specific surface area in the range of from about 5 to about 12 m$^2$/g and from 50 to 95 parts by weight of a colored pigment, wherein the sum of the parts by weight of filler and colored pigment is 100.

2. A pigment composition of claim 1 which contains from 0.5 to 20 percent by weight of additives, based on the weight of colored pigment.

3. A pigment composition of claim 1, which comprises from about 15 to 35 parts by weight of the filler and from about 65 to 85 parts by weight of the pigment; wherein the sum of the parts by weight of the filler and colored pigment is 100.

4. A pigment composition of claim 3 wherein the mean particle size of said filler is in the range of from 2 to 8 $\mu$m.

5. A pigment composition of claim 4 wherein 90 percent of the filler particles have a particle size in the range of from 1 to 9 $\mu$m.

6. A pigment composition of claim 5 wherein the filler is composed primarily of particles having a spherical shape.

7. A pigment composition of claim 6 wherein the surface of the filler particles have numerous pores with a diameter in the range from 0.05 to 0.6 $\mu$m.

8. A pigment composition of claim 3 wherein 90 percent of the filler particles have a particle size below 20 $\mu$m.

9. A pigment composition of claim 8 wherein the filler is a polymeric organic filler.

10. A pigment composition of claim 9 wherein the colored pigment is selected from the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

11. A pigment composition of claim 9 wherein the colored pigment is an inorganic pigment selected from the group consisting of metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate.

12. A pigment composition of claim 9 wherein the colored pigment is an organic pigment selected from the group consisting of azo, azomethine, methine, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine and quinophthalone pigments, or a mixture or solid solution thereof.

13. A pigment composition of claim 12 wherein the colored pigment is an organic pigment selected from the group consisting of a dioxazine, diketopyrrolopyrrole, quinacacridone, phthalocyanine, indanthrone or iminoisoindolinone pigment, or a mixture or solid solution thereof.

14. A pigment composition of claim 9 wherein the colored pigment is a transparent organic pigment.

15. A pigment composition of claim 14 wherein the transparent organic pigment has a mean particle size below 0.2 μm.

16. A pigment composition of claim 9 wherein the filler is a polyamide.

17. A pigment composition of claim 16 wherein the filler has a mean particle size in the range of from 2 to 8 μm.

18. A pigment composition of claim 17 wherein the colored pigment is a transparent quinacridone pigment or a transparent diketopyrrolopyrrole pigment.

19. A method of preparing a thin film finish having a three dimensional appearance, which comprises:
   (a) preparing a coating composition comprising a binder, an effect-producing amount of an effect pigment, an effective coloring amount of a colored pigment, and an effect-enhancing amount of a small particle size filler having a porous surface, and
   (b) applying the coating composition to a substrate to yield a thin film having a three dimensional effect wherein the essentially two dimensional film has the appearance of possessing significant depth.

20. A method of claim 19 wherein the coating composition is a heat curable, air-drying or physically-drying, or cross-linking chemically-reactive coating system.

21. A method of claim 19 wherein the coating composition is a stoving finish containing a binder selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins, diene rubbers and copolymers thereof.

22. A thin film finish on a substrate prepared according to claim 19.

23. A method of claim 19 wherein the coating composition is an aqueous or solvent based automotive paint system.

24. A method of claim 23 wherein the pigment ingredients in the coating composition comprise from 25 to 65 parts by weight of the colored pigment; from 10 to 60 parts by weight of the effect pigment; and from 10 to 35 parts by weight of the filler, wherein the sum of the parts by weight of the colored pigment, effect pigment and filler is 100.

25. A method of claim 24 wherein the pigment ingredients in the coating composition comprise from 35 to 60 parts by weight of the colored pigment; from 20 to 50 parts by weight of the effect pigment; and from 15 to 30 parts by weight of the filler.

26. A method of claim 24 wherein the colored pigment is a transparent organic pigment.

27. A method of claim 24 wherein the effect pigment is a metallic-effect pigment, a metal oxide-coated metal pigment, a platelet shaped graphite pigment, a platelet shaped molybdenum disulfide pigment, a pearlescent mica pigment, a metal oxide-coated mica pigment, an organic effect pigment, a layered light interference pigment, a polymeric holographic pigment or a liquid crystal interference pigment.

28. A method of claim 27 wherein the effect pigment is a metal effect pigment selected from the group consisting of aluminum, gold, brass and copper metal effect pigments, a pearlescent mica pigment, or an organic effect pigment selected from the group consisting of copper phthalocyanine blue, copper phthalocyanine green, carbazole dioxazine, diketopyrrolopyrrole, iminoisoindoline, iminoisoindolinone, azo and quinacridone effect pigments.

29. A method of claim 24 wherein the filler is a polymeric organic filler.

30. A method of claim 29 wherein the filler is a polyamide.

31. A substrate coated with a thin film finish prepared according to claim 30.

32. A coating composition useful for producing a thin film finish that appears to possess significant depth, which comprises a binder, an effect-producing amount of an effect pigment, an effective coloring amount of a colored pigment, and an effect-enhancing amount of a small particle size filler having a porous surface.

33. A coating composition of claim 32 wherein the pigment ingredients comprise from 35 to 60 parts by weight of the colored pigment; from 20 to 50 parts by weight of the effect pigment; and from 15 to 30 parts by weight of the filler, wherein the sum of the parts by weight of the colored pigment, the effect pigment and the filler is 100.

34. A coating composition of claim 33 which is a water or solvent based automotive finish.

35. A coating composition of claim 34 which is a water or solvent based automotive finish comprising a metallic, pearlescent mica or graphite effect pigment, a transparent organic pigment as the colored pigment and a porous polyamide as the filler.

* * * * *